UNITED STATES PATENT OFFICE.

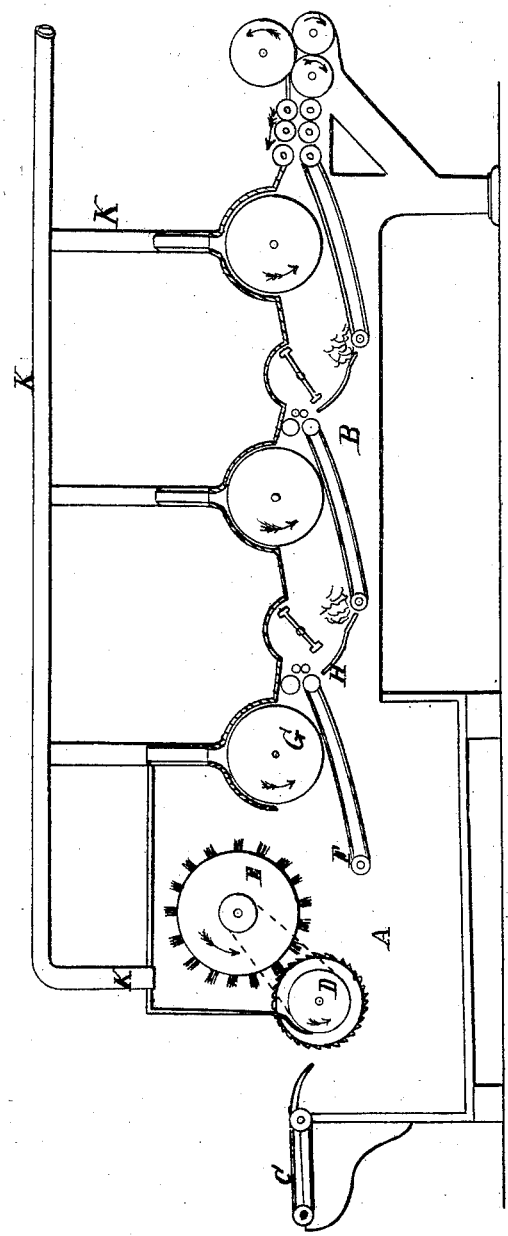

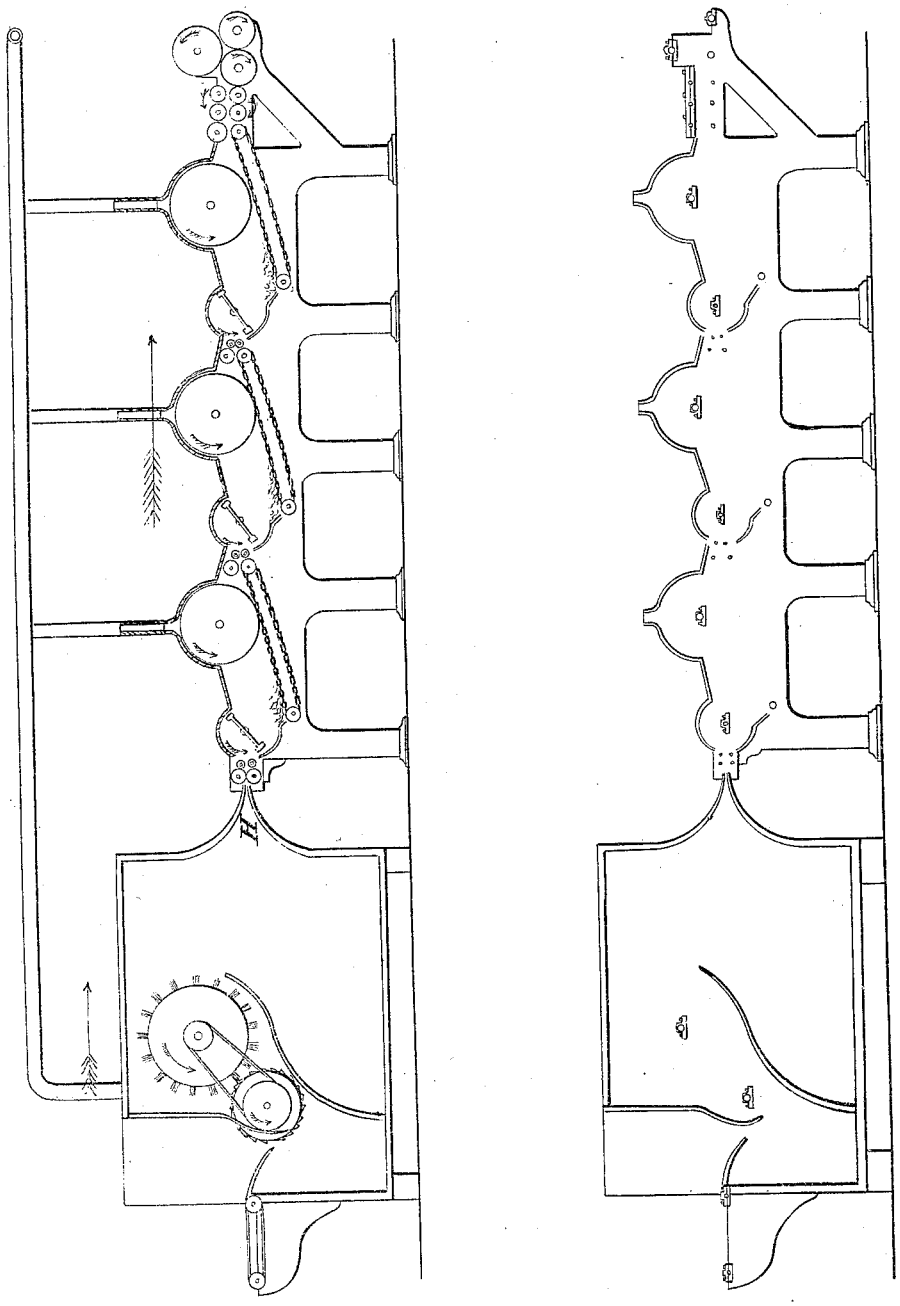

GEO. G. HENRY, OF MOBILE, ALABAMA.

MANUFACTURING COTTON YARN.

Specification of Letters Patent No. 16,117, dated November 25, 1856.

*To all whom it may concern:*

Be it known that I, GEORGE G. HENRY, of the city and county of Mobile, in the State of Alabama, have invented a new and useful Improvement in Machinery for Manufacturing Cotton Yarns, of which the following is a full, clear, and exact description, reference being had to the accompanying drawings, which make part of this specification, and in which—

Figure 1 represents a longitudinal section of a cotton gin and spreader upon my improved plan, and Fig. 2 represents a modification of my invention.

In the present mode of manufacturing cotton yarns, the ginned cotton is received at the factory in bags or bales which have been compressed, by powerful machinery, into small compass, for convenient transportation. When thus compressed the fiber of the cotton is so much tangled and matted as to be materially injured, and considerable waste and loss is incurred, in re-opening and loosening it for manufacture.

It is the object of my invention to avoid the injury to the fiber and the loss of stock incident to handling and packing the ginned cotton, thus not only effecting a great economy in the manufacture, but also producing a superior quality of yarns.

My invention consists in an arrangement of the cotton gin, in relation to and in combination with the spreader and any sequence of the most approved machinery for spinning cotton, or with any single machine of such sequence.

In Fig. 1 of the accompanying drawings A is the gin connected with the spreader or lap machine B.

To secure a nearly perfect result I construct my gin as follows, premising that for the purpose of avoiding injury to the fiber I make the teeth of the saw finer than is usual, and diminish the feed, in proportion to the quantity of yarn to be spun in a day.

The gin A is furnished, in front, with an endless apron C, to which the seed cotton is weighed, that it may pass evenly through the gin (A) and spreader (B) to make the lap uniform. D is a saw cylinder and E a brush, operating in the well known manner of these parts of a cotton gin.

F is an endless apron which may be of any open work and moves in a direction from the brush-wheel E toward the opening H, through which the ginned cotton passes directly to the spreader or lap-machine B.

Over the apron F and nearly in contact therewith, is placed a revolving cylinder G, which may be perforated, or covered with wire gauze. The ginned cotton is thrown, by the draft from the brush-wheel E, upon this cylinder (G) and apron (F), which carry it to the opening H, (where it is caught in the sheet, between the feeders I I' of the spreader (B) through which it passes to the lap, or, after the feed-rollers (I I'), may be arranged the rollers of the lap upon which the sheet may be wound, to be taken directly thence to the carders), the motes &c. at the same time settling in the usual manner or sifting through the apron (F) to the bottom of the gin, whence they may be removed from time to time.

The gin (A), with the exception of the above described modifications, may be made in any of the approved modes, and even the ordinary gin, with the opening H at its end, as shown in Fig. 2 of the drawings, would throw the cotton so that the feed-rollers (I I') of the spreader (B) would take it and pass it to the next machine of the sequence.

The following are some of the marked advantages I attain, in the manufacture of cotton yarns, by my combination of the above described machinery. 1st. I dispense with that handling and pressing of the fiber that is not only injurious to the fiber in itself, but that involves much injury to the fiber from the violent usage it requires to re-open and restore it to the straight condition in which it leaves the gin. 2d. The yarns made from a staple that has not been thus injured must necessarily be better than those made from a staple that has undergone the violent treatment necessary to re-open it after it has been baled or even packed in a basket. 3d. Economy of machinery, for I dispense with the press and the willy or packer. 4th. Economy of labor, by dispensing with the packing, re-opening and picking of the ginned cotton, involved in the old process, for in my improved machine the cotton is not handled after being weighed to the apron of the gin. 5th. I avoid the large amount of waste and loss of stock incident to and inseparable from the present mode of manufacturing cotton yarn.

It may be well to add, that any desired mode of carrying the dust from the operative parts of the machinery, may be conveniently applied to my invention, of which I have shown one example in Fig. 1 of the drawings, in which the pipe K may serve to convey the dust from the gin and spreader to the outside of the building in which they work, and the draft through this pipe (K) may be increased at pleasure by the use of an auxiliary fan.

I do not wish to be understood as limiting myself to any precise sequence of machinery after the combined gin and lap machine, for it is obvious that my invention may be applied to any preferred machinery for manufacturing cotton yarns.

I am aware that it has been proposed to spin cotton yarns directly from the gin as in Briant's patent of 1823, and by other modes; this I do not claim, but What I do claim and desire to secure by Letters Patent is, The combination of the gin and "preparation," substantially in the manner and for the purposes herein described,—that is to say, the arrangement of the cotton gin in immediate connection with and to operate in combination with the spreader or lap machine of any desired construction, so that the gin and spreader combined, shall operate in a regular sequence with the carding and drawing and other spinning machinery, substantially as hereinbefore set forth.

In testimony whereof I have hereunto subscribed by name.

GEO. G. HENRY.

In presence of—
JOHN S. HOLLINGSHEAD,
A. DUVALL.